Feb. 26, 1935.   F. RÜSBERG   1,992,324
MANUFACTURE OF POTASSIUM CARBONATE AND SODIUM SULPHATE
Filed May 11, 1933
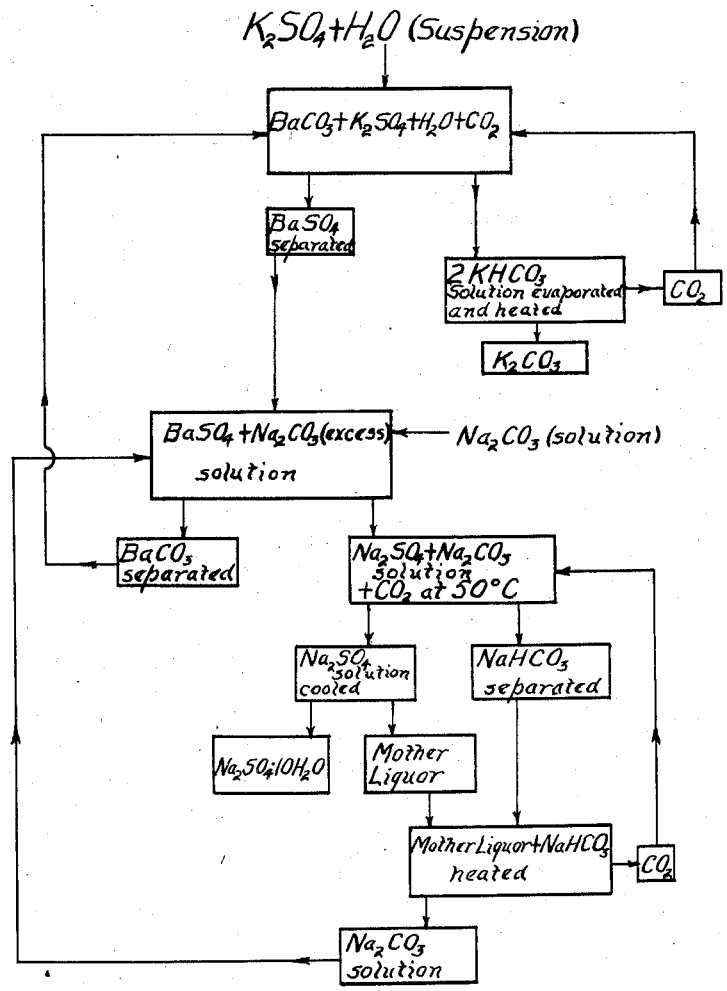
Inventor
Friedrich Rusberg
By Bailey & Larson
Attorney Patented Feb. 26, 1935

1,992,324

UNITED STATES PATENT OFFICE 1,992,324

MANUFACTURE OF POTASSIUM CARBONATE AND SODIUM SULPHATE

Friedrich Rüsberg, Berlin - Niederschoneweide, Germany, assignor to The Kali-Chemie Aktiengesellschaft, Berlin, Germany Application May 11, 1933, Serial No. 670,616
In Germany May 19, 1932

7 Claims.  (Cl. 23—63)

This invention relates to the manufacture of potassium carbonate from potassium sulphate and has for its main object to provide for a process in which barium or strontium carbonate may be used in an efficient and economical manner for the conversion of potassium sulphate into potassium carbonate.

A further object of the invention is to provide for a process for making potassium carbonate and sodium sulphate from potassium sulphate and sodium carbonate.

Still a further object of the invention is to provide for a process for making potassium carbonate and sodium sulphate from potassium sulphate and sodium carbonate, in which the excess of sodium carbonate used may be recovered and employed again in the process.

With these and other objects in view the invention consists in treating with carbon dioxide a suspension of barium or strontium carbonate in an aqueous solution of potassium sulphate, thus obtaining a solution of potassium bicarbonate and solid barium or strontium sulphate, which are reacted with a solution of sodium carbonate to obtain a solution of sodium sulphate and solid barium or strontium carbonate, which are used again for converting fresh potassium sulphate into potassium bicarbonate.

The drawing comprises a flow sheet which presents the details of the process hereinafter described.

Example

A suspension of 220 kg. of barium carbonate in an aqueous solution of 180 kg. of potassium sulphate is treated with carbon dioxide, until the barium carbonate is converted into barium sulphate and an aqueous solution of potassium bicarbonate is formed. The barium sulphate is separated from the solution, which is evaporated, thus decomposing the potassium bicarbonate into potassium carbonate and carbon dioxide. 140 kg. of potassium carbonate are recovered from the solution by crystallization. The barium sulphate is suspended in an aqueous solution of 320 kg. of sodium carbonate and the suspension is heated for about 4 hours at a pressure of about 4 atmospheres. The reaction mixture is cooled to about 90° C. and the barium carbonate obtained is separated from the solution by filtration. After washing the barium carbonate it is reacted with fresh potassium sulphate. The liquid obtained by the filtration, which contains about 140 g. of sodium sulphate and 220 g. of sodium carbonate per liter is worked up by fractional crystallization. It is, however, preferred to treat this liquid with carbon dioxide at about 50° C., thus precipitating about 85% of the sodium carbonate present in the liquid as sodium bicarbonate, which is separated from the mother liquor. This mother liquor is cooled to about —3° C., thereby precipitating the sodium sulphate present as Glauber's salt, which is separated from its mother liquor. This mother liquor and the sodium bicarbonate may be heated with water, in order to obtain sodium carbonate solution and carbon dioxide, which may be used in the process. The mother liquor and the sodium bicarbonate may however also directly be used for converting fresh barium sulphate obtained in the process into barium carbonate by heating them under pressure together with the necessary amount of water and sodium carbonate. The carbon dioxide liberated by this heating process may be used for the treatment of the liquid obtained in the manufacture of the barium carbonate as described.

The process described may also be carried out with strontium carbonate instead of barium carbonate. In this case a double salt of potassium sulphate and strontium sulphate is formed besides potassium bicarbonate solution by the carbon dioxide treatment of the suspension of strontium carbonate in an aqueous solution of potassium sulphate. This solid double salt is however easily decomposed by treatment with washing liquids containing potassium bicarbonate, whereby an aqueous solution of potassium sulphate and solid strontium sulphate are obtained. This aqueous solution of potassium sulphate is used again in the process. The strontium sulphate is converted into strontium carbonate in the same manner as described above for the production of barium carbonate from barium sulphate, with the exception that smaller amounts of sodium carbonate may be employed. It is even possible to work with 1 mol. of sodium carbonate for 1 mol. of strontium sulphate, in which case solid strontium carbonate and a solution of sodium sulphate are obtained.

The foregoing detailed example has been given for clearness of understanding only, and no unnecessary limitations should be understood therefrom, but the appended claims should be construed as broadly as permissible in view of the prior art.

I claim:

1. A process for making potassium carbonate and sodium sulphate which consists in treating with carbon dioxide a suspension of barium carbonate in an aqueous solution of potassium sulphate, separating the barium sulphate formed from the solution of potassium bicarbonate obtained, decomposing the potassium bicarbonate into potassium carbonate and carbon dioxide by heating, converting the barium sulphate formed into barium carbonate by treatment with an excess of aqueous solution of sodium carbonate, separating the barium carbonate from the solution of sodium sulphate and sodium carbonate, returning the barium carbonate into the first step of the process and recovering sodium sulphate from the solution of sodium sulphate and sodium carbonate obtained.

2. A process for making potassium carbonate and sodium sulphate which consists in treating with carbon dioxide a suspension of barium carbonate in an aqueous solution of potassium sulphate, separating the barium sulphate formed from the solution of potassium bicarbonate obtained, decomposing the potassium bicarbonate into potassium carbonate and carbon dioxide by heating, converting the barium sulphate formed into barium carbonate by heating it under pressure with an excess of aqueous solution of sodium carbonate, separating the barium carbonate from the solution of sodium sulphate and sodium carbonate, returning the barium carbonate into the first step of the process and recovering sodium sulphate from the solution of sodium sulphate and sodium carbonate obtained.

3. A process for making potassium carbonate and sodium sulphate, which consists in treating with carbon dioxide a suspension of barium carbonate in an aqueous solution of potassium sulphate, separating the barium sulphate formed from the solution of potassium bicarbonate obtained, decomposing the potassium bicarbonate into potassium carbonate and carbon dioxide by heating, converting the barium sulphate formed into barium carbonate by treatment with an excess aqueous solution of sodium carbonate, separating the barium carbonate from the solution of sodium sulphate and sodium carbonate, returning the barium carbonate into the first step of the process, precipitating sodium bicarbonate from the solution of sodium carbonate and sodium sulphate by treatment with carbon dioxide, separating the sodium bicarbonate from the liquid and precipitating sodium sulphate by cooling said liquid.

4. A method according to claim 3 in which the sodium bicarbonate and the mother liquor of the sodium sulphate obtained in the process are used in the step of converting barium sulphate of the process into barium carbonate for the process by heating under pressure said sodium carbonate, mother liquor and barium sulphate together with water and sodium carbonate.

5. A method according to claim 3 in which the sodium bicarbonate and the mother liquor obtained in the process are converted into an aqueous solution of sodium carbonate by heating in presence of water and the aqueous solution of sodium carbonate obtained is used in the step of converting barium sulphate of the process into barium carbonate for the process.

6. A method according to claim 1 in which strontium carbonate is used instead of barium carbonate.

7. A process for making potassium carbonate and sodium sulphate which consists in treating with carbon dioxide a suspension of a carbonate of an alkali earth metal selected from the group consisting of barium and strontium in an aqueous solution of potassium sulphate, separating the alkali earth metal sulphate thus formed from the solution of potassium bicarbonate obtained, heating the potassium bicarbonate, thereby decomposing it into potassium carbonate and carbon dioxide, treating the alkali earth metal sulphate with an excess of aqueous solution of sodium carbonate, thereby converting it into an alkali earth metal carbonate, separating the alkali earth metal carbonate thus formed from the solution of sodium sulphate and sodium carbonate obtained, returning the alkali earth metal carbonate to the first step of the process, and recovering sodium sulphate from the solution of sodium sulphate and sodium carbonate.

FRIEDRICH RÜSBERG.